United States Patent Office 3,371,034
Patented Feb. 27, 1968

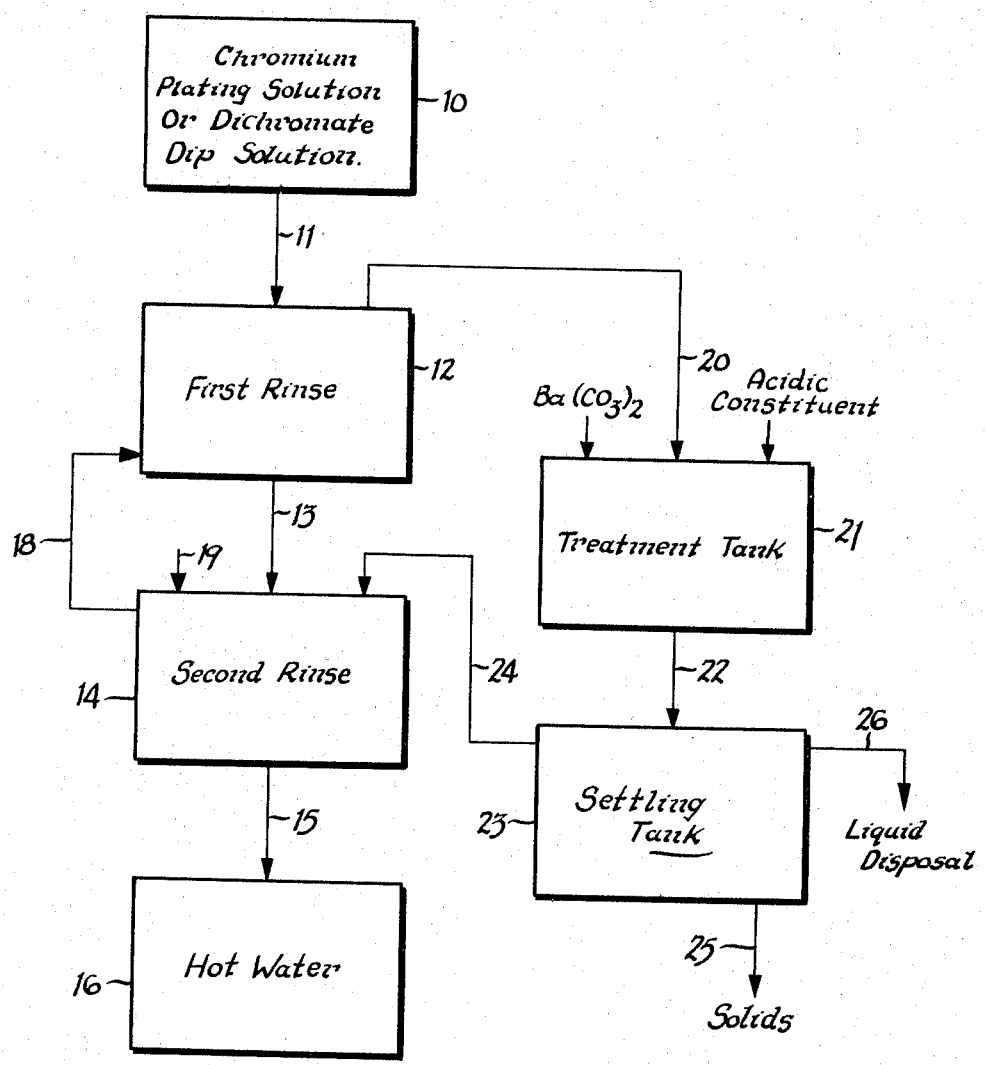
INVENTOR.
RAYMOND RICHARDS
BY
WILSON, SETTLE, BATCHELDER
ATT'YS. & CRAIG

3,371,034
PROCESS FOR REMOVAL OF CHROMIUM IN INDUSTRIAL WASTE WATERS
Raymond Richards, 709 Virginia Park,
Detroit, Mich. 48202
Continuation-in-part of application Ser. No. 560,254,
June 24, 1966, which is a continuation-in-part of
application Ser. No. 524,495, Feb. 2, 1966. This
application Jan. 31, 1967, Ser. No. 622,856
9 Claims. (Cl. 210—51)

ABSTRACT OF THE DISCLOSURE

A process for chemically removing chromium ions from industrial waste solutions by direct precipitation with barium carbonate in such solutions acidified with nitric or hydrochloric acid or their salts.

Cross-references to related applications

This application is a continuation in part of copending application Ser. No. 560,254, filed June 24, 1966, now abandoned, which application was a continuation in part of application Ser. No. 524,495, filed Feb. 2, 1966, now abandoned.

Background of the invention

The present invention relates to a method of purifying industrial waste waters containing chromic acid and metallic chromate salts. More particularly, this invention provides a continuous method for purifying industrial waste waters, for example, the rinse solutions of chromium plating operations by removing therefrom the chromium ion, and other heavy metal constituents in such waste waters as an easily separable precipitate, which precipitate contains substantially all of the chromium ion and other metallic ions that were initially present in the waste waters as chromium chromates and other metallic chromates.

Those skilled in the art of chromium plating have long known that barium chromate is insoluble in aqueous solutions other than those which are acidic and thus are aware that the chromium ion content of chromium plating solutions is removable therefrom by precipitating that chromium ion in the form of barium chromate. However, for a long time, it has also been known that the direct precipitation of chromate with barium has serious objections, including the objection of excessive expense in relation to the generally used process of reduction of the chromic ion which employs sulfur dioxide, sodium bisulfite, or the like, with subsequent precipitation with lime; and the objection that the waste solutions from such direct precipitation contain an unacceptably high concentration of barium and they cannot be directly discarded into sewers, rivers or streams.

Summary of the invention

In accordance with this invention, it has now been found that the heretofore known disadvantages of the direct precipitation of chromium ions from waste solutions can be overcome and that the improved direct precipitation process of this invention is commercially satisfactory for use either in batch form or continuous processing form. The problem of substantially completely removing the chromium ion components from the chromium ion-containing waste solution, while simultaneously avoiding the presence of an undesirable quantity of barium in the waste water, is that the simple addition of an excess of barium carbonate to such a chromium ion-containing waste solution is ineffective to precipitate all of the chromium ion from that solution as barium chromate.

It has been found that direct precipitation of the chromium ion content of such a chromium ion-containing solution can be satisfactorily effected with an excess of barium carbonate if the waste solution is first acidified with hydrochloric or nitric acid or the barium salts thereof in an amount sufficient to convert all of the metallic chromates present in that waste solution into the salt of the acid which is added. The addition to such an acidified waste solution of an excess of barium carbonate causes the precipitation of all, or substantially all, of the chromium ion content of the solution as barium chromate and also effects the precipitation of the metallic ion content of the waste solution as the hydroxide, or complex hydroxide, and such hydroxide precipitate normally adsorbs to the surface of the barium chromate and is easily removed therewith. The resulting precipitate has the filtration characteristics of a crystalline material and is easily filtered, or otherwise separated by known means, from the waste solution. When these materials are employed, the conditions above stated are followed and the major portion of the purified waste solution is recirculated, or recycled, to the chromic acid plating or chromic dip rinse solution tank, any quantity of waste solution which is discarded contains such a small concentration of barium that it is directly discardable into sewers, rivers or streams. The process of this invention, therefore, provides a commercially successful direct precipitation method for purifying chromium ion-containing solutions either on a batch or a continuous basis.

The rinse waters in an industrial chromium plating installation, or the rinse waters from a chromate dip operation normally contain from about 200 to about 1,000 parts per million of the hexavalent and trivalent chromium ion, calculated as $CrO_3$, but none of these rinse waters contain only the chromium ion as contaminants. In the case of the chromium plating process rinse waters, the rinse solutions are normally contaminated with ions of the metals which have been chromium plated in the solution, such as iron, cadmium, zinc, nickel, copper, etc. In the case of the rinse waters from a dichromate dip process, the rinse waters normally contain ions of sodium, iron, zinc, cadmium, nickel, copper, etc. While the dilute rinse solutions ordinarily contain a higher concentration of chromium ions than any of the other metallic ions, the proportion of such other metallic ions can vary substantially, depending upon the particular metal being plated or dipped and the particular process being empoyed.

In attempting to remove all, or substantially all, of the chromium ion from such rinse, or waste solutions it was found that the addition of barium carbonate to the rinse or waste solution caused the solution to become more basic, or the pH of the solution to rise numerically. Increasing the amount of barium carbonate added to the solution caused the acidity of the solution to decrease to such a degree that insufficient barium carbonate would dissolve in the solution to precipitate all of the chromium ion present in that solution. Under these conditions, it was noted that even though a substantial excess of barium carbonate over that amount stoichiometrically required to form barium chromate with all of the chromium ion in the solution was added to the solution it was not possible to directly precipitate all the chromium ion from that solution. In such instances, it was ordinarily noted that the pH of the solution had risen to above about 5.5 and usually was above about 6.0, but the specific pH value varied as a function of the concentration of chromium ion and other metallic chromates present in the waste solution and many times reached about 6.5.

It was found that all, or substantially all, of the chromium ion content of such solutions was removable as a barium chromate precipitate, and the other metallic ion content was concurrently removable with the barium chromate precipitate as absorbed, or occluded, metallic hydrates or hydroxide if the rinse solution was preliminarily, or concurrently with the addition of the excess of barium carbonate, treated with hydrochloric or nitric acid or the barium salts thereof; the amount of hydrochloric or nitric acid, or the barium salt thereof, that is required varies from solution to solution that is to be purified. For any given waste solution, however, the amount of acid that is preferred is the stoichiometric amount required to convert all of the heavy metal chromates which are present in the waste solution to the chloride or nitrate salt of the heavy metal. The acid, or barium salt thereof, can be added on a batch or continuous basis; in either circumstance an excess of barium carbonate should be added relative to that quantity stoichiometrically required to precipitate all of the chromium ion as barium chromate, e.g. from 1.2–1.4 times the required amount. This addition of barium carbonate maintains the pH, or acidity, of the solution such that the heavy metal salts hydrolyze to the metallic hydrate or hydroxide as the barium chromate precipitates from the solution, and these hydrates and hydroxides absorb on or occlude in the barium chromate precipitate and are removed therewith.

The best method for determining the amount of acid required for a given rinse, or waste, solution is to first analyze the waste solution for chromium ion concentration by routine analytical procedures. Second, an amount of barium carbonate from 2 to 4 times the stoichiometric amount required to form barium chromate with all of the determined chromium ion in the solution is added and the solution agitated. After agitation and the precipitate has settled it will be noted that the solution remains yellow in color; hydrochloric or nitric acid, or the barium salt thereof and preferably nitric acid or barium nitrate is then slowly added to the solution with agitation until the color disappears. The measured amount of acid or salt added is the correct quantity for use on subsequent corresponding quantities of that waste solution, and routine calculation provides the quantity for batchwise or continuous processing.

In the process of this invention, it is desirable to avoid the addition of acid in excess of that required to convert the heavy metal chromates into the corresponding heavy metal chloride or nitrate since such excess hydrochloric or nitric acid will react with excess barium carbonate present to form the corresponding barium salt, i.e., barium chloride or barium nitrate, and these salts are soluble in the solution from which the precipitate is removed. While such barium chloride, barium nitrate or barium bicarbonate materials, which are soluble in the treated solutions from which the precipitate is removed by filtration or otherwise, can be easily removed therefrom by conventional precipitation as insoluble barium sulfate by adding sulfuric acid or sulfuric acid salt thereto, it is preferred to avoid such a secondary purification step. When the quantity of acid which is added to the rinse solution is controlled, as closely as possible to that quantity which is required only for the conversion of the metallic chromates in the solution to the corresponding salt thereof, the secondary purification step is avoided and the overall efficiency of the process is thus increased. It was found that in a rinse solution to which only the required quantity of hydrochloric or nitric acid or barium salt thereof had been added, in the presence of an excess of barium carbonate, after stirring and at the end of the pecipitation, a very small quantity of barium bicarbonate remains in the effluent after filtration or decantation and the quantity of chromate or chromium ion in a solution is so small as to be undetectable by ordinary analytical methods. The precipitate is substantially crystalline, precipitates cleanly from the solution and is easily removed from the waste water by ordinary filtration, settling, or decantation procedures. The precipitate is primarily barium chromate but also contains the other metallic ions in the form of heavy metal hydroxides, or complex hydrates of the heavy metals originally present in the waste solution.

Brief description of the drawings

The process of the invention is illustrated in the single flow sheet which illustrates the utilization of the process of this invention in treating the waste, or rinse waters, from a chromium plating solution, or a dichromate dip solution. As shown on the flow sheet, the plating process or dip process is normally carried out in a chromium plating solution tank, generally designated 10, and the parts treated therein are then passed in straight line flow direction, as indicated by the arrows 11, 13 and 15, first through rinse tank 12, thereafter through second rinse tank 14, and finally through hot water tank 16, from which the chromium plated or chromium coated parts are in a condition ready for further processing or ultimate utilization.

The chromium electroplated or dipped parts from tank 10 drag over or carry into, first rinse tank 12 some of the chromium plating or chromium dip solution from that tank and as parts continue to be rinsed in tank 12 the solution builds up with the contaminating chromium ions, in hexavalent and trivalent form; the rinse water in first rinse tank 12 will also become contaminated, in time, with the other metallic ion chromates, such as iron, zinc, cadmium, copper, nickel, or the like, as above generally explained, and the same condition will occur in second rinse tank 14, with continued processing, but normally to a somewhat lower concentration than builds up in first rinse tank 12. In normal installations, second rinse tank 14 is arranged to enable circulation of a portion of the solution therein back to first rinse tank 12 through line 18, with fresh water being continuously, or periodically, supplied to second rinse tank 14, as needed, through line 19. Thus, the rinse, or waste water from first rinse tank 12, which is removed for processing through line 20, to the treatment tank 21, contains any of a number of water soluble chromium compounds, including chromic sulfate, chromic acid, potassium, and sodium dichromate, and iron, zinc, copper, and chromium chromates or the like. The rinse or waste solution in treatment tank 21 is purified by adding to that tank an excess of barium carbonate and the hydrochloric or nitric acid constituent, in the proportions above stated, as indicated by the arrows thereon. Treatment tank 21 is equipped with agitation means of conventional type, not shown, and the agitated solution in treatment tank 21 is then fed through line 22 into settling tank 23 and the precipitate containing the barium chromate and other metallic hydroxides or complex hydrates is allowed to settle therein and is periodically removed therefrom through solids line 25 for subsequent disposal as a solid waste. The decanted liquid, or solution, from which the precipitate has been separated is returned to second rinse tank 14 through line 24, and, as above generally described, this solution contains a minor quantity of barium bicarbonate and small quantities of the barium salt of the acid used, i.e., barium chloride or barium nitrate. It is to be understood that in the operation of the process, maximum effort should be expended to employ accurate procedures in controlling the quantity of acidic constituent introduced continuously into treatment tank 21, such that any undesired excess of acidic constituent is a relatively small quantity. Settling tank 23 is also provided with line 25 for removing solids from the tank, and it is to be understood that the removal of solids through line 25 encompasses the simple draining of solids therefrom or may include a subsequent filtration step. The excess effluent from settling tank 23 is removable, preferably after filtering, through line 26 directly to sewer, river or stream, as desired. In either continuous or batch operations the excess effluent is removable through line 26 to subsequent treatment equipment for precipitation of barium salts as barium sulfate.

It will be understood that ordinary equipment required in carrying out the batch or continuous process of the present invention such as pumps, tanks, agitators, valves, sludge removal facilities, sumps, and the like, are necessary to carry out the process, but are omitted from the flow sheet, since they are unnecessary to an understanding of the important process steps.

*Description of the preferred embodiments*

The process of the invention is illustrated in somewhat greater detail in the examples which follow, but it is to be understood that the examples are illustrative only and that the proportions of ingredients, the specific acids and salts used therein may be changed within the limits of the above general description of the process of this invention.

EXAMPLE I

The rinse water from the first rinse tank in a chromium plating commercial installation was analyzed and found to have the following composition.

Waste composition:

| | Oz./gal. |
|---|---|
| $CrO_3$ as $H_2CrO_4$ | 0.04 |
| $Cr^{3+}$ as $Cr_2(CrO_4)_3$ | 0.0002 |
| $Fe^{3+}$ as $Fe_2(CrO_4)_3$ | 0.0002 |
| $Ni^{2+}$ as $NiCrO_4$ | 0.0001 |
| $SO_4^=$ | 0.00025 |

For each 1000 gallons of the rinse water in a treatment tann, barium carbonate was added to the tank in the amount of 8.75 lbs. Using barium nitrate as the acidic constituent, 3.376 ozs. of barium nitrate were added to the tank and the mixture was vigorously agitated for about 5–8 minutes. At the end of the agitation, the mixed slurry was transferred to a settling tank and allowed to settle overnight. The precipitate had a bright yellow color. After separating the precipitate in the settling tank the effluent was returned to the second rinse tank in the chromium plating installation as needed to maintain the level therein. Analysis of the effluent showed the effluent to contain about 12–20 parts per million of barium as barium bicarbonate and barium nitrate.

EXAMPLE II

This example illustrates the process of this invention in its continuous form. The waste solution being continuously purified was the rinse solution taken from the first rinse tank in a chromium plating installation for automotive parts; the rate of rinse solution treatment was approximately 1000 gallons per hour, and 950 gallons per hour of the pudified solution were recycled to the second rinse tank in the plating line. Approximately 50 gallons per hour of the treated solution, after filtration, were discarded.

The waste solution had the following average composition.

Waste composition:

| | Oz./gal. |
|---|---|
| $CrO_3$ as $H_2CrO_4$ | 0.08 |
| $Cr^{3+}$ as $Cr_2(CrO_4)_3$ | 0.0004 |
| $Fe^{3+}$ as $Fe_2(CrO_4)_3$ | 0.0004 |
| $Ni^{2+}$ as $Ni CrO_4$ | 0.0002 |
| $SO_4^=$ | 0.0005 |

Barium carbonate, in the form of an approximately 30% by weight aqueous slurry, was metered into the treatment tank at the rate of 17.5 lbs./hr. and barium nitrate was fed at the rate of 6.75 ozs./hr. A bright yellow precipitate was formed and separated from the effluent in the settling tank; the effluent, being recycled and discarded, had an average analysis of 25 to 40 parts per million barium nitrate and bicarbonate.

The same average composition waste solution when treated by adding 17.5 lbs./hr. of barium carbonate and 5.35 ozs./hr. of barium chloride operated satisfactorily to remove the chromium ion and produce an effluent containing about 20 to about 45 parts per million of barium as barium chloride and barium bicarbonate.

While it will be apparent that the preferred embodiments of the invention are well calculated to fulfill the objects above stated, it will be appreciated that the invention is susceptible to modification, variation and change without departing from the proper scope or fair meaning of the subjoined claims.

What is claimed is:

1. A method for purifying industrial waste waters containing chromium ions and metallic chromate salts comprising the steps of (1) acidifying said waste waters by adding thereto an acidic constituent selected from the group consisting of hydrochloric acid, nitric acid and the barium salts thereof in an amount sufficient to convert the said metallic chromate salts in said waste water into the salt of said acidic constituent added thereto, (2) adding an amount of barium carbonate to said solution in excess of that required to stoichiometrically precipitate all of the chromium ions from said solution as barium chromate, (3) removing from said solution the insoluble precipitate containing said chromium ions and other metallic ions that were initially present in said waste water, and (4) discarding at least a portion of the solution from which said precipitate was separated.

2. A method in accordance with claim 1 wherein at least a portion of the solution from which said precipitate was separated is recycled.

3. A method in accordance with claim 1 wherein said acid is nitric acid.

4. A method in accordance with claim 1 wherein said acid is hydrochloric acid.

5. A method in accordance with claim 1 wherein said acid is barium nitrate.

6. A method in accordance with claim 1 wherein said acid is barium chloride.

7. A continuous method for purifying industrial waste waters containing the chromium ion which comprises the steps of (1) feeding said waste waters to a retainer vessel, (2) concurrently adding to said waste water in said vessel an acidic constituent selected from the group consisting of hydrochloric acid, nitric acid and the barium salts thereof in an amount sufficient to convert the metallic chromates in said waste water into the salt of said acidic constituent added thereto and an amount of barium carbonate to said solution in excess of that stoichiometrically required to precipitate all of the chromium ion from said solution as barium chromate, (3) agitating said solution and removing the insoluble precipitate from said solution, and (4) recycling at least a part of said liquid from which said precipitate was separated.

8. A process in accordance with claim 7 wherein said acidic constituent is barium nitrate.

9. A process in accordance with claim 7 wherein said acidic constituent is barium chloride.

References Cited

UNITED STATES PATENTS 3,325,401   6/1967   Lancy _____ 210—49

OTHER REFERENCES

Hoover, C. R., et al., Disposal of Waste Liquors from Chromium Plating, Ind. & Eng. Chem., January 1941, vol. 33, pp. 131–134 (Posl).

MICHAEL E. ROGERS, *Primary Examiner.*